April 24, 1934.  O. E FISHBURN ET AL  1,956,528
GEAR SHIFTER
Filed Jan. 15, 1932
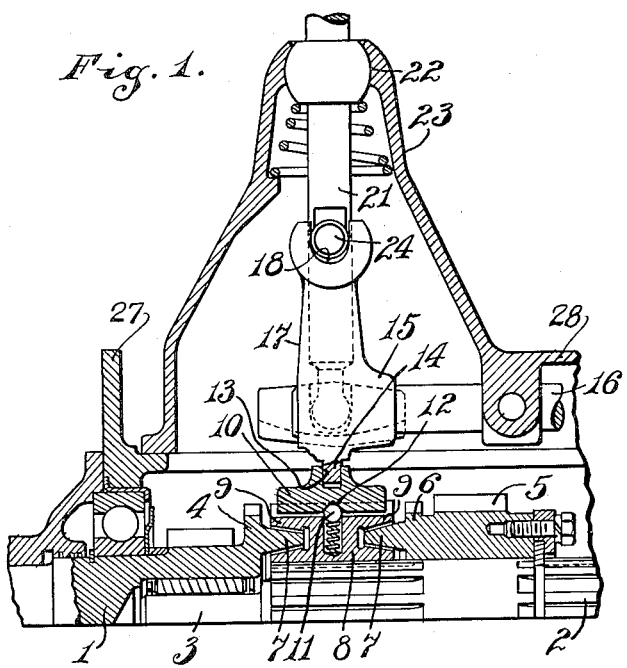
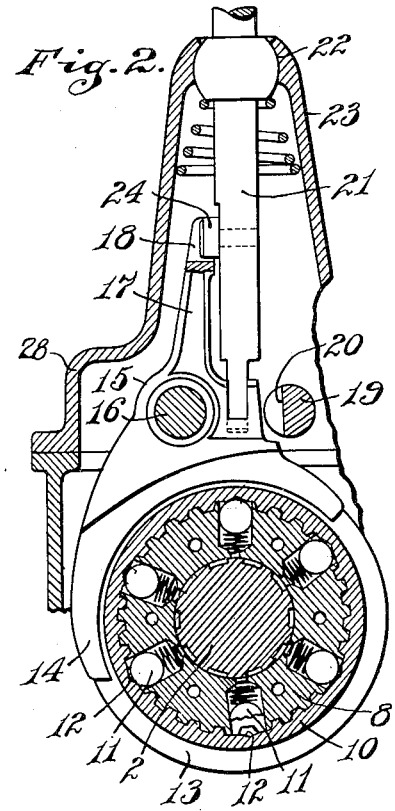
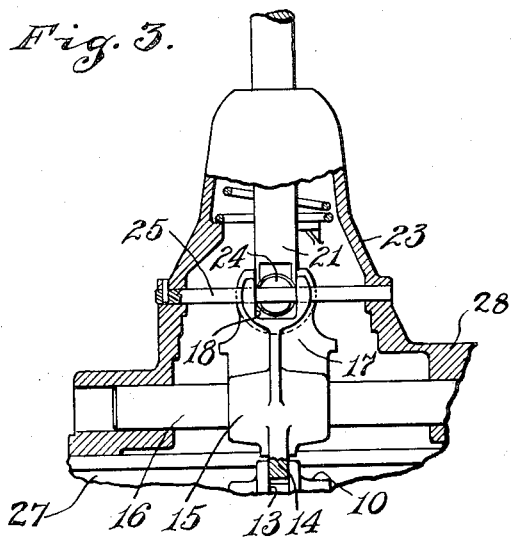
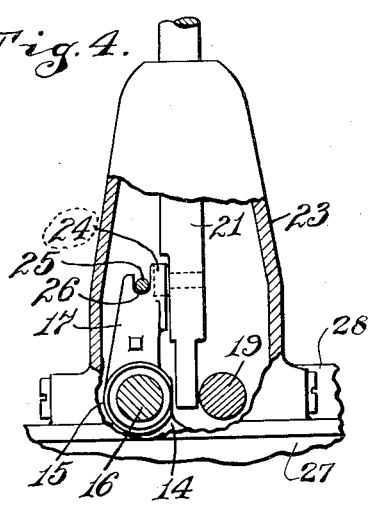
INVENTORS
Otto E. Fishburn and
Henry H. Robbins,
BY Hood & Hahn
ATTORNEYS Patented Apr. 24, 1934

1,956,528

UNITED STATES PATENT OFFICE 1,956,528

GEAR SHIFTER

Otto E. Fishburn and Henry H. Robbins, Muncie, Ind., assignors to Warner Gear Company, Muncie, Ind., a corporation of Indiana Application January 15, 1932, Serial No. 586,899

1 Claim. (Cl. 74—39)

Our invention relates to improvements in shifting mechanism for transmission gears and the like, particularly adapted for use in automobile drive.

One of the objects of our invention is to provide a connection between the shift lever of the transmission and the shifting member whereby the leverage of the transmission may be materially increased for one set of gears, over that applied to another set of gears.

Another object of our invention is the construction of a shifting mechanism whereby this increase in the power of the lever may be effected by simple and easily manufactured devices.

The present application is a continuance in part of our application for Transmission synchronizers filed December 22, 1930 and bearing Serial Number 504,084.

For the purpose of disclosing our invention, we have illustrated certain embodiments thereof in the accompanying drawing, in which:

Fig. 1 is a longitudinal sectional view, showing a side elevation of the transmission shift mechanism, of so much of a transmission as is necessary for illustrating the invention;

Fig. 2 is a transverse sectional view;

Fig. 3 is a longitudinal sectional view showing a modification of our invention, and Fig. 4 is a transverse sectional view.

In the structure illustrated in Figs. 1 and 2 the shift mechanism of our invention is shown as operating synchronizing clutch mechanism for drivingly connecting a driving shaft 1 and a driven shaft 2. In the structure the driven shaft 2 is shown as being pivoted at one end 3 in the inner end of the shaft 1. The shaft 1 is provided with a gear type clutch 4 and rotatably mounted on the shaft 2 is a driving gear 5, driven in the usual manner from the shaft 1 and having a gear type clutch 6. The shaft 1 and the gear 5 each, is also provided with a cone clutch member 7. Splined on the shaft 2 is an axially shiftable hub 8 having on its opposite faces cone clutch members 9 for cooperation with the members 7. Splined on the hub 8 is an axially shiftable ring or connector member 10, the splined teeth of which are adapted to respectively engage either the teeth of the clutch member 4 or the teeth of the clutch member 6. This shifting ring 10 is resiliently connected to the hub 8 by spring poppets 11 engaging in cammed seats 12 in the ring. In operation of the structure so far described, when the member 10 is shifted in one direction or the other, due to the resilient connection therebetween and the hub 8, the hub 8 will likewise be axially shifted to engage one of the sets of the cone clutch members 7 and 9 depending upon the direction of shift. This engagement will tend to synchronize the speed of either the gear 5 or the shaft 1 with the speed of the shaft 2. A continued movement of the member 10 will disengage the member from the hub 8 and the internal splined teeth thereof will engage either the teeth of the clutch member 4 or the clutch member 6, depending upon the direction of shift, and positively connect the shaft 2 either to the gear 5 or the shaft 1. The shift ring 10 is provided with an annular groove 13 to receive a shifting fork 14. This fork extends downwardly from a hub 15 which is mounted on a shift rod 16. Extending upwardly from the hub 15 is an arm 17, preferably formed integrally with the hub 15 and having at its upper end a fork 18.

A second shift rod 19 is provided to carry a second shift fork for other gears and this shift rod it will be noted is provided on its inner face with a suitable notch 20. The shift lever 21 is of the usual type having a universal mounting 22 in a cone shaped extension 23 of the cover for the transmission casing. This shift lever by a lateral shift is moved to engagement in either the notch 20 or the fork 18 depending upon the direction of movement and when moved into engagement with the notch 20 it will be noted that the lower end of the lever so engages the notch and that the engagement point is the farthest from the fulcrum point 22 of the lever. When the shift lever is moved laterally in the opposite direction, an extension pin 24 engages in the fork 18 on the extension 17. This pin 24, it will be noted is much nearer the fulcrum point 22 of the shift lever and therefore, while the same shifting effort is applied to the lever as when shifting the shift rod 19, this effort is multiplied by the construction so that increased power is applied to the shifting of the shift ring 10.

It has been found that in some instances, due to the engagement between the lever 21 and the fork 18, there may be a tendency to rock the hub 15 on the shift rod 16 thereby causing a binding of the shift fork 14 in the bottom of the groove 13. To prevent this rocking action and to guide the upper end of the arm 17, as illustrated in Figs. 3 and 4 we extend through the casing portion 23 in a direction parallel with the axis of the rod 16, a guide rod 25. This rod is stationarily mounted in the casing and is adapted to engage in a notch 26 in the upper end of the arm 17, the arm in this instance being widened to provide sufficient material in which to form the notch. Due to the engagement of the rod 25 in the notch 26, the shift fork 14 is held against any lateral displacement.

The transmission mechanism including the necessary gears and shafts are contained in and supported by the enclosing casing 27. The cover 28 for this casing supports the various shifting mechanisms including the shift rods, the shift lever and the shifting forks whereby all of the shifting mechanisms may be assembled on the cover before the same is placed in position.

We claim the following:

A shift mechanism for transmissions comprising a shift lever, a shift rod, a hub mounted on said shift rod, a downwardly extending shift fork carried by said hub, an upwardly extending operating fork carried by said shift rod and extending in a plane at right angles to the shift fork for engagement with the shift lever above its lower end, a guide rod laterally stationarily mounted above said shift rod and extending parallel with the axis thereof and an open topped fork portion on said upwardly extending arm embracing said guide rod at a point opposite the point of engagement between said arm and lever to prevent rotative movement of said shift fork.

OTTO E. FISHBURN.
HENRY H. ROBBINS.